United States Patent [19]

Shackelford

[11] Patent Number: 4,828,438

[45] Date of Patent: May 9, 1989

[54] BLIND FASTENER

[75] Inventor: James R. Shackelford, Cuyahoga Falls, Ohio

[73] Assignee: The B.F. Goodrich Company, Akron, Ohio

[21] Appl. No.: 169,533

[22] Filed: Mar. 17, 1988

[51] Int. Cl.⁴ .................. F16B 13/04; F16B 37/02
[52] U.S. Cl. ............................... 411/34; 411/55; 411/173
[58] Field of Search .................. 411/34–38, 411/43, 55, 396, 397, 432, 173, 183

[56] References Cited

U.S. PATENT DOCUMENTS

| 2,553,236 | 5/1951 | Bratfisch | 411/34 |
| 2,660,083 | 11/1953 | Tyson | 411/396 |
| 3,667,340 | 6/1972 | Black | |
| 4,007,659 | 2/1977 | Stencel | 411/34 |
| 4,036,098 | 7/1977 | Schruff | 411/34 |
| 4,266,460 | 5/1981 | Klimowicz | 411/397 |

Primary Examiner—Neill R. Wilson
Attorney, Agent, or Firm—Joseph Januszkiewicz

[57] ABSTRACT

A blind fastener that is installed from one side only of a hole in a plate structure wherein the blind fastener has a tubular body with a head and an inset loosely journaled in the central bore of such tubular body. A roll pin interconnects the tubular body and the insert to allow for limited vertical movement in a direction along the central axis of the central bore which in cooperation with the loose journaling of the insert within the central bore allows a floating action to the insert. The insert has a flange at its lowermost end for abuttingly engaging the lowermost annular edge of the tubular body to provide means for exerting forces on the tubular body to upset such tubular body.

7 Claims, 2 Drawing Sheets

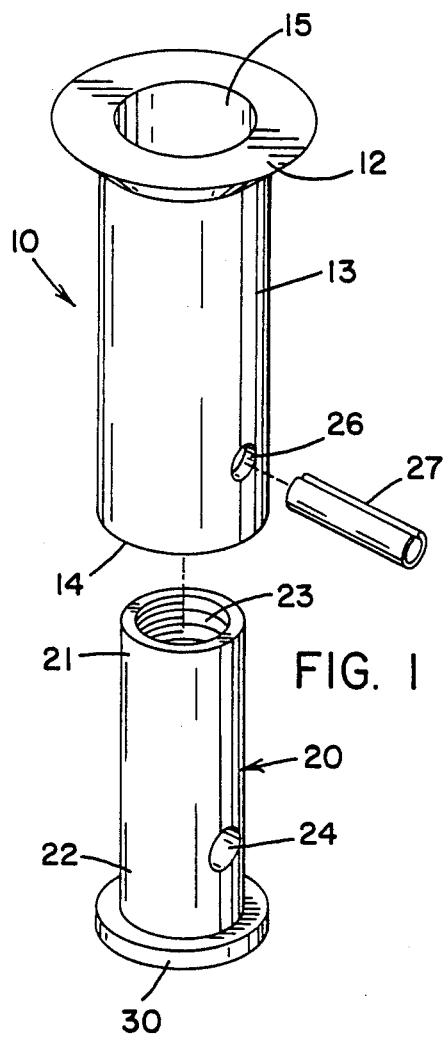
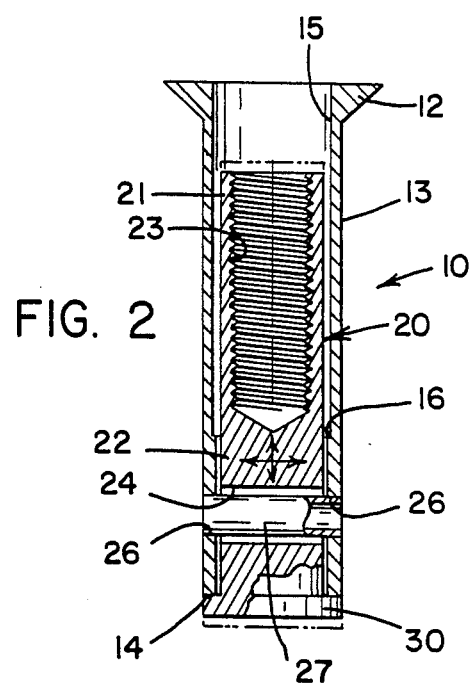
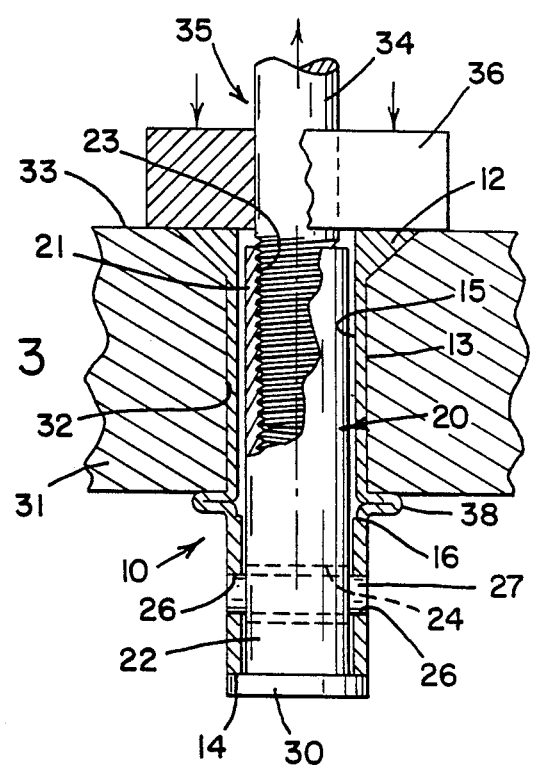

4,828,438

BLIND FASTENER

BACKGROUND

This invention relates to blind fasteners and more particularly to a blind fastener of the type that can be installed entirely from one side of a structure and has an insert threaded portion that cooperates with the main body of the fastener to provide a floating action. Conventional blind fasteners have an internal screw thread that facilitates the upsetting action of a tubular body of the fastener, which upsetting action cooperates with the head of the fastener to secure the fastener in its position on the structure or plate members. It was important in these installations to locate the hole within the structure that receives the blind fastener precisely as any deviation from the intended installation hole would result in the need to provide either another hole for a second fastener or else adjust the product or member that was to be installed on the structure. The present invention provides a threaded inset that is loosely journaled in the tubular portion of the fastener, which tubular portion is upset thereby securely locking the fastener in position on the structure while providing versatility to the fastener. With the loosely fitting threaded insert, sufficient clearance is obtainable in all directions to compensate for any slight misalignment of the fastener body thus increasing efficiency and versatility.

These type of fasteners are particularly useful in the aircraft industry where lightweight fasteners and particularly of the blind type fasteners are necessary.

SUMMARY OF THE INVENTION

This invention in its preferred embodiment is an integral blind fastener of the type that has a head and a tubular body which is integral therewith. The tubular body is adapted to be passed through a hole in a structure or plate member and is capable of being upset or reshaped for engagement with the blind surface of the structure. The tubular body has a central bore and an annular edge opposite the head. An insert with a smaller external diameter than the diameter of the central bore is mounted in the tubular body and freely floats in the central bore. Such insert has a solid cylindrical end portion and an upper internal threaded bore portion for receiving the draw rod for an upsetting action on the tubular body and for receiving a bolt to fasten a plate to the structure. The very lower end portion of the insert has a flange that abuts the annular edge of the tubular body to facilitate upsetting thereof. The solid cylinder end of the insert is connected to the lower end of the tubular body by a through pin with sufficient clearance between the pin and the bore in the insert that receives the pin to allow limited vertical movement of the insert relative to the tubular body.

BRIEF DESCRIPTION OF THE DRAWINGS

FIG. 1 is an exploded isometric view of a blind fastener;

FIG. 2 is a side elevational view of the blind fastener as shown in FIG. 1 in cross section with the roll pin shown in full;

FIG. 3 is a side elevational cross sectional view of the fastener upset in a plate member or structure with a portion of the fastener broken away and showing a portion of a draw rod and anvil which said in the upsetting action of the fastener;

DESCRIPTION OF THE PREFERRED EMBODIMENT

Figure 4:
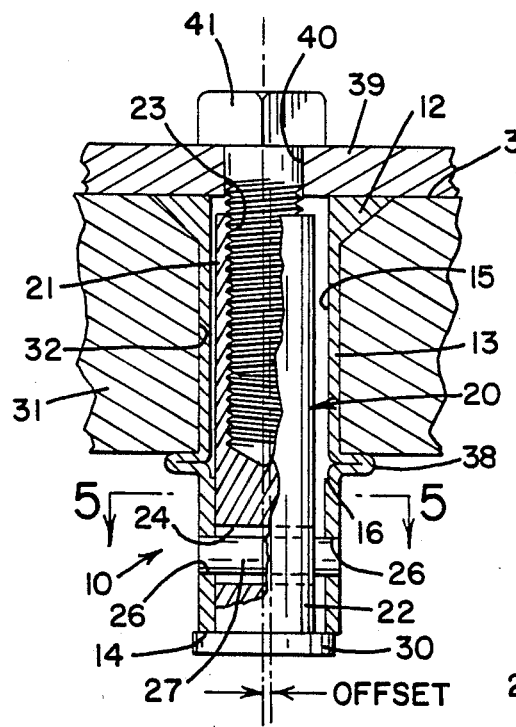
FIG. 4 is a side elevational cross sectional view of the fastener secured to a structure with a bolt and product plate secured to the fastener.

Referring to the drawings wherein like reference numerals designate like or corresponding parts throughout the several views, there is shown in FIG. 1 a fastener 10. The fastener 10 has an upper tapered head 12 that is flat across the top and tapers inwardly toward a longitudinally extending tubular or hollow cylindrical body 13 that terminates into an annular edge 14. Such tubular body 13 has a central bore 15. The upper and intermediate wall portion of tubular body 13 is thin walled in construction compared to the lower wall portion of tubular body 13 to facilitate an upsetting action to the thin walled portion. The junction of the thin walled portion with the thicker lower wall portion of tubular body 13 presents a shoulder 16 within central bore 15.

Loosely journaled in the central bore 15 of tubular body 13 is a sleeve or insert 20 that has an upper (as viewed in FIGS. 1 and 2) portion 21 and a lower solid cylindrical portion 22. The upper portion 21 has an internal threaded bore 23 while the lower portion 22 has a bore 24 whose axis is normal to that of the threaded bore 23.

The lower wall portion of tubular body 13 has a pair of aligned bores 26 which can be aligned with the bore 24 in sleeve 20 while receives a pin 27. The diameter of bore 24 is substantially larger than that of bore 26 in the tubular body 13, such that pin 27 is frictionally engaged by bore 26 but has considerable clearance with bore 24 of insert 20 to allow vertical movement of sleeve or insert 20 relative to tubular body 13. With the clearance space between the sleeve 20 and tubular body 13, sleeve 20 is allowed to move laterally relative to tubular body 13 thus providing a floating action therebetween. The very lower portion of sleeve 20 has an annular flange 30 which abuttingly engages the annular edge 14.

To attach the fastener 10 to a structure or plate member 1, a hole 32 is drilled therethrough as illustrated in FIG. 3. Such hole 32 is then countersunk to provide a taper thereto to accommodate the tapered head 12 of the fastener 10. Fastener 10 is inserted into the hole 32 with the top of tapered head 12 flush with the top surface 33 of structure 31 and the shank or lower portion of the fastener projecting out of the hole 32. A draw rod 34 of an upsetting tool 35 is threadedly connected to the threaded portion of the fastener 10 as illustrated in FIG. 3. An non-rotatable annular anvil 36 is drawn down over the rod 34 and has its lower surface in engagement or bearing against the top surface 33 of structure 31. A the rod 34 is moved upwardly (as viewed in FIG. 3), pressure is maintained in the anvil 36 and the continued upward movement of rod 34 has the annular flange 30 of sleeve 20 exert pressure on tubular body 13 effecting a buckling of the thin walled portion of tubular body 13 designated 38 in FIG. 3. Such buckling of 38 is applied against the blind surface of structure 31 thereby firmly securing the fastener on structure 31 between such buckled portion 38 and the tapered head 12 of fastener 10. Although plate structure 31 is illustrated as relatively thick, such thickness is relative and the fastener described can be applied to a thin walled structure.

Figure 5:
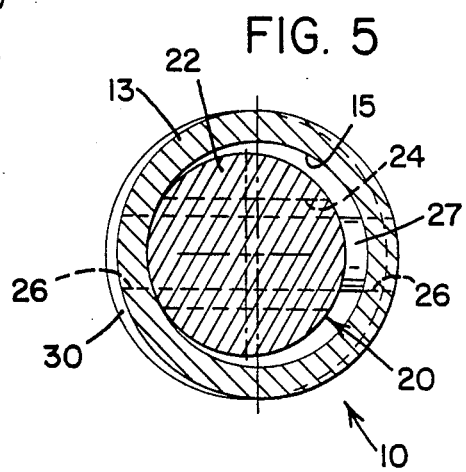
FIG. 5 is an enlarged cross section of the fastener taken on line 5—5 of FIG. 4.

Once blind fastener 10 is secured to the structure or plate member 31, a product or thin sheet metal member 39 may be secured to the structure 31 by laying such plate member 39 into structure 31 and have its predrilled hole 40 in alignment with hole 32 in structure 31 and thence screw threading a bolt 41 into the threaded bore 23 in sleeve 20. As can be seen in FIG. 4, the clearance space between the sleeve 20 and the tubular body 13 allows for misalignment of holes 40 and 32 to compensate for slight misalignment of parts wherein the operator does not have access to the blind side of structure 31. As seen in FIGS. 4 and 5, the clearance space between the sleeve 20 and the tubular body 13 has considerable latitude such that their respective longitudinal axes have sufficient off-set clearance.

Figure 6:
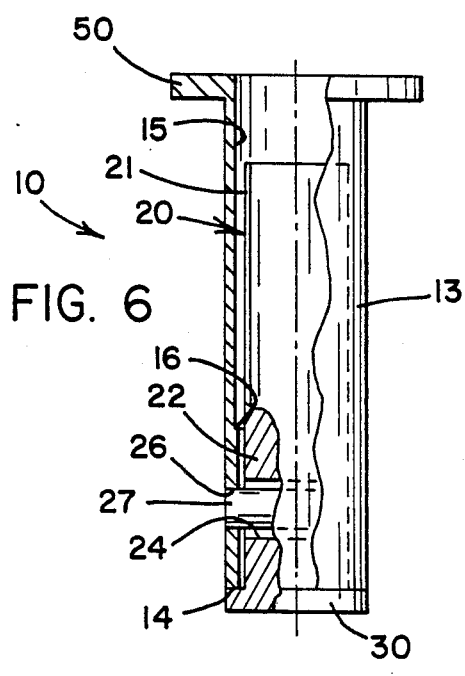
FIG. 6 is a side elevational view of a modified form of the fastener with a portion broken away and part in cross-section; and, FIG. 7 is a further modification of the fastener showing the inert in a side elevational view, partly in cross section.

A modification of the described invention is shown in FIG. 6 wherein the fastener is identical to that of the previously described embodiment except that the head 50 of the fastener is a flat annular member rather than tapered as in the first embodiment. In this instance the bore 32 in structure 31 can have its uppermost portion counter-sunk into an enlarged bore portion to compliment such head 50, otherwise its installation is identical to the first described embodiment.

Figure 7:
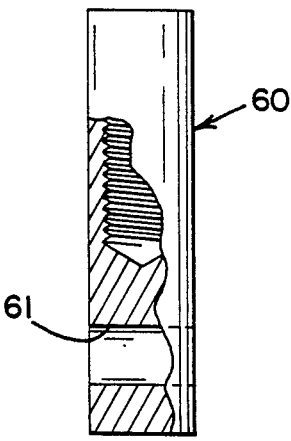

A further modification of the invention is shown in FIG. 7 wherein the fastener is identical to that of the first described embodiment except that the lowermost portion of the insert 60 is cylindrical in shape without any flange as flange 30 in FIGS. 1 and 2. In this instance the pin that would fit into bore 61 an the bores corresponding to bores 26 in the tubular member 13 would provide the means for upsetting the tubular member 13 when used with insert 60. In this instance the pin would be a hardened pin to facilitate such action. Insert 60 may also be tubular in section. Insert 60 may also be tubular with a flanged end similar to insert 20.

It will be apparent that although a specific embodiment and certain modifications of the invention have been described in detail, the invention is not limited to the specifically illustrated and described construction since variations may be made without departing from the principles of the invention.

I claim:

1. A blind fastener having a head and tubular body which is integral with said head, said tubular body having a central opening with a central axis extending longitudinally therethrough, said tubular body having a thin wall portion along its length to facilitate the outward protrusion as by an upsetting action to engage the blind surface to which such fastener is attached, the end portion of said tubular body remote from said head having an annular edge, a longitudinally extending sleeve journaled in said tubular body, the internal diameter of said central opening being greater than the external diameter of said sleeve to provide a clearance therebetween to permit radial movement of said sleeve within said opening, said sleeve having an internal upper threaded portion, means interconnecting said sleeve to the lower portion of said tubular body to allow limited relative movement therebetween in the direction of said central axis and said radial movement, said interconnecting means operative to provide an upsetting action to said tubular body upon movement of said sleeve relative to said lower portion of said tubular body in excess of said limited relative movement.

2. A blind fastener as set forth in claim 1 wherein the lower end portion of said sleeve is secured to said lower end portion of said tubular body to provide for said movements.

3. A fastener of the type having a head and a tubular body which is integral with said head and capable of passing through a hole in a structure and is capable of being reshaped for engagement with the blind surface of the structure, said tubular body having a central bore with a central axis, the one end of said tubular body remote from said head being of a thicker wall section than the remaining portion of said tubular body to facilitate an upsetting action, a longitudinally extending insert loosely journaled in said central bore having clearance space therebetween in a plane normal to said central axis to permit relative movement between said insert and said tubular body in said plane normal to said central axis, the upper portion of said insert having a threaded bore whose axis is generally parallel to the axis of said central bore, means interconnecting said tubular body and the lower portion of said insert to permit limited movement of said insert in the general direction of said central axis relative to said tubular body to provide a floating insert relative to said tubular body.

4. A blind fastener as set forth in claim 3 wherein said insert has a radially outwardly extending flange on the lower portion thereof for abuttingly engaging the lowermost annular edge of said tubular body to provide a means for exerting a force on said tubular body to upset said tubular body.

5. A blind fastener having a head and tubular body which is integral with said head, said tubular body having a central opening with a central axis extending longitudinally therethrough, said tubular body having a thin walled portion along its length to facilitate the outward protrusion as by an upsetting action to engage the blind surface to which such fastener is attached, the end portion of said tubular body remote from said head having an annular edge, a sleeve journaled in said tubular body, the internal diameter of said central opening being greater than the external diameter of said sleeve to provide a clearance therebetween, said sleeve having an internal upper threaded portion, means interconnecting said sleeve to the lower portion of said tubular body to allow limited relative movement therebetween in the direction of said central axis, said interconnecting means operative to provide an upsetting action to said tubular body upon movement of said sleeve relative to said lower portion of said tubular body in excess of said limited relative movement, said interconnecting means includes a pair of oppositely disposed bores in said lower end portion of said tubular body and a bore extending through the lower end portion of said sleeve with a pin extending through all of said bores, and said lower end portion of said sleeve having a radially outwardly extending projection that abuttingly engages the lower edge portion of said tubular body remote from said heat to provide the means to exert an upward force on said tubular member to provide an upsetting action.

6. A blind fastener as set forth in claim 5 wherein the diameter of said bore in said lower end portion of said sleeve is substantially greater than the outside diameter of said pin to provide for said limited relative movement of said sleeve relative to said tubular body in a direction of said central axis.

7. A fastener of the type having a head and a tubular body which is integral with said head and capable of passing through a hole in a structure and is capable of being reshaped for engagement with the blind surface of the structure, said tubular body having a central bore with a central axis, the one end of said tubular body remote from said head being of a thicker wall section than the remaining portion of said tubular body to facilitate an upsetting action, an inset loosely journaled in said central bore having clearance space therebetween in a plane normal to said central axis to permit relative movement between said insert and said tubular body in said plane normal to said central axis, the upper portion of said inert having a threaded bore whose axis is generally parallel to the axis of said central bore, means interconnecting said tubular body an the lower portion of said insert to permit limited movement of said insert in the general direction of said central axis relative to said tubular body to provide a floating insert relative to said tubular body, said insert has a radially outwardly extending flange on the lower portion thereof for abuttingly engaging the lowermost annular edge of said tubular body to provide a means for exerting a force on said tubular body to upset said tubular body, said means interconnecting said tubular body and said insert include a pair of aperture in said one end of said tubular body and an aperture in said lower portion of said insert with a roll pin interconnecting all of said apertures, and said apertures in said insert being greater in diameter than the outside diameter of said roll pin to provide substantial clearance therebetween to allow said limited movement of said insert in said general direction of said central axis within said tubular body.

* * * * *